US011861688B1

(12) United States Patent
Gupta et al.

(10) Patent No.: US 11,861,688 B1
(45) Date of Patent: Jan. 2, 2024

(54) RECOVERY-AWARE CONTENT MANAGEMENT

(71) Applicant: Amazon Technologies, Inc., Reno, NV (US)

(72) Inventors: Rohit Gupta, Seattle, WA (US); Ayman Omar Farahat, San Francisco, CA (US); Han Wu, Redmond, WA (US); Pragyana K. Mishra, Seattle, WA (US); Rohan Gurappagouda Patil, Seattle, WA (US); Douglas Wong, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

(21) Appl. No.: 16/539,871

(22) Filed: Aug. 13, 2019

(51) Int. Cl.
*G06Q 30/08* (2012.01)
*G06F 16/2453* (2019.01)
*G06F 16/2457* (2019.01)

(52) U.S. Cl.
CPC ......... *G06Q 30/08* (2013.01); *G06F 16/2453* (2019.01); *G06F 16/24578* (2019.01)

(58) Field of Classification Search
CPC ................ G06F 16/24578; G06F 16/2453
See application file for complete search history.

(56) References Cited

U.S. PATENT DOCUMENTS

| | | | | |
|---|---|---|---|---|
| 8,706,548 B1* | 4/2014 | Blume | ............... | G06Q 30/0256 705/14.1 |
| 10,146,876 B2* | 12/2018 | Rama | ............... | G06F 16/24578 |
| 2005/0144067 A1* | 6/2005 | Farahat | ............... | G06Q 30/0269 705/14.66 |
| 2006/0190354 A1* | 8/2006 | Meisel | ............... | G06Q 30/0277 705/14.73 |
| 2007/0124425 A1* | 5/2007 | Gross | ............... | G06Q 30/0273 709/217 |
| 2009/0319333 A1* | 12/2009 | Dangaltchev | ...... | G06Q 30/0249 705/7.29 |
| 2011/0196736 A1* | 8/2011 | Pavagada | ............... | G06Q 30/02 705/14.43 |

(Continued)

OTHER PUBLICATIONS

Yong Yuan; A Survey on Real Tme Bidding Advertising; IEEE; 2014; pp. 418-423 (Year: 2014).*

*Primary Examiner* — Albert M Phillips, III
*Assistant Examiner* — Jermaine A Mincey
(74) *Attorney, Agent, or Firm* — HOGAN LOVELLS US LLP

(57) ABSTRACT

Bid values submitted for various keywords can take into account the recovery propensity between paid search and organic search. When submitting a bid to a search engine provider for a keyword, an entity may get a certain level of performance in return. If not submitting a bid, however, the entity will likely still get some level of performance, although likely less than for paid search. In order to optimize for a parameter such as impressions, purchases, or profit, the recovery propensity can be taken into account in order to adjust the bid price, taking into account the relative performance of paid and organic search and then optimizing for the determined goal. Organic search data in some embodiments can be obtained through testing or modeling, or a combination thereof.

15 Claims, 14 Drawing Sheets

(56) References Cited

U.S. PATENT DOCUMENTS

| | | | | |
|---|---|---|---|---|
| 2013/0132437 | A1* | 5/2013 | Park | G06Q 30/02 |
| | | | | 707/780 |
| 2014/0074586 | A1* | 3/2014 | Rangarajan | G06Q 30/0275 |
| | | | | 705/14.41 |
| 2016/0253695 | A1* | 9/2016 | Grieselhuber | G06Q 30/0256 |
| | | | | 705/14.42 |
| 2017/0358000 | A1* | 12/2017 | Jain | G06Q 30/0249 |
| 2018/0268444 | A1* | 9/2018 | Dong | G06F 16/951 |
| 2019/0286682 | A1* | 9/2019 | Dzumla | G06F 16/90344 |
| 2021/0004868 | A1* | 1/2021 | Montgomery | G06Q 30/0275 |

* cited by examiner

Query Search Report     2/3/2030 – 3/3/2030

| Enrolled | SQR | Keyword | Item | OS Rank | PS Rank | Item Rank | ... |
|---|---|---|---|---|---|---|---|
| Y | Hammer | Tools | ABC123 | 1.5 | 1.1 | 2.1 | |
| N | Drill | Tools | ABC321 | 2.0 | 2.0 | 1.5 | ... |
| ⋮ | ⋮ | ⋮ | ⋮ | | | ⋮ | |

FIG. 5

Clusters     2/3/2030 – 3/3/2030

| | | | Cluster: |
|---|---|---|---|
| Cluster: | A1234 | | A1234 |
| Keywords: | A, B, C, D | | A4321 |
| Items: | A1, B1, C1, D1 | | B2222 |
| OS Rank (avg): | 2.1 | | ⋮ |
| PS Rank (avg): | 1.1 | | |
| Recovery Factor: | 0.8 | | |
| Last Refresh: | 2/1/2030 | | |

FIG. 6

SQR Detail     2/3/2030 – 3/3/2030

| Modify | Delete | Pause |

— 702

| Total | Mobile | Desktop | Tablet |

Query: Hammer
Optimized: Yes
Keywords: A, B, C, D, ...
Cluster: A1234
Item: ABC1243

OS Rank: 1.5

PS Rank: 1.1

— 704

Page Characteristics:

Maps: Y
Blurb: Y
Above Fold: N
OS Rank 1 URL: example.com
First Page Presence: Y
Recovery Factor: 0.5

— 706

| Optimized | Non-Optimized |

(Optimized pie: PS, OS, SA)    (Non-Optimized pie: PS)

RECOVERY-AWARE CONTENT MANAGEMENT

BACKGROUND

Entities often want to have their content associated with search results or other such information. In search engine marketing, for example, entities can bid on a keyword for which they want to show specific content, such as related advertising. The specific content is then shown on a search results page corresponding to that keyword. Such advertising corresponds to paid search links, which are often placed above the organic (or unpaid) search results. Traditionally, when a bid is placed on a keyword, the advertiser is not aware of the organic search results that may be the same or similar to the paid search ad for which the advertiser paid. The paid search ad links may be exactly the same as the top organic search links, which is often the case for well-known or popular items. It is currently difficult, if not impossible, for advertisers to determine information about their organic search results in order to optimally set their bid values for various keywords.

BRIEF DESCRIPTION OF THE DRAWINGS

Various embodiments in accordance with the present disclosure will be described with reference to the drawings, in which:

FIG. 5 illustrates an example query result page that can be generated in accordance with various embodiments.

FIG. 6 illustrates an example cluster page that can be generated in accordance with various embodiments.

FIG. 7 illustrates an example query result page that can be generated in accordance with various embodiments.

DETAILED DESCRIPTION

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

As discussed herein, approaches in accordance with various embodiments provide various technical advantages with respect to conventional approaches. For example, the ability to more accurately determine sponsorships and bidding can reduce the amount of processing and memory capacity needed to determine and track bids that might not be worthwhile. The ability to make these determinations automatically can also reduce the amount of time needed for manual analysis and interaction, which will reduce the amount of computing time needed for the determinations. Improving the accuracy of search results through such a system can also reduce bandwidth and latency requirements across a network as users will more quickly be able to locate content of interest, requiring fewer page views and data transmissions. The ability to use deep learning for rank determination can also save significant resources versus what would be required to manually crawl and analyze organic search data for large numbers of queries. Such approaches can also help to optimize the elements on an interface page, particularly for devices with small display regions, which can simplify the user interface, require less navigation (such as where relevant results appear on the first page), and make the elements more relevant to a user.

Figure 1:
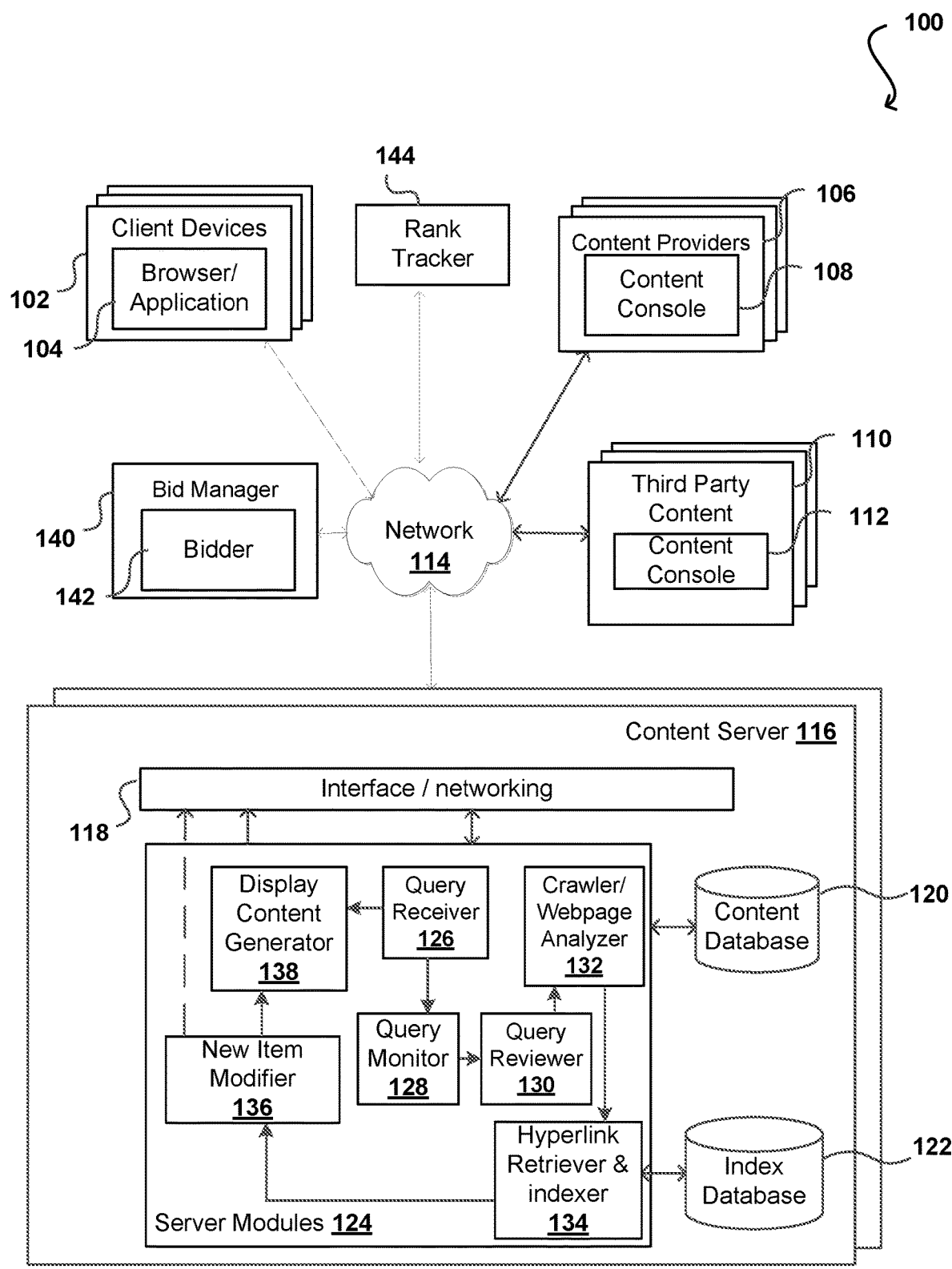
FIG. 1 illustrates components of an example environment in which aspects of various embodiments can be implemented.

FIG. 1 illustrates an example computing environment 100 in which aspects of various embodiments can be implemented. The example environment 100 includes content providers 106 in communication with content servers 116 and with client devices 102 via at least one network 114. The content providers 106 may also incorporate features of the content servers 116 as discussed subsequently herein to process content in a similar manner as the content servers 116. Client devices 102 and content provider devices 106 can include any processor and memory based electronic devices with capabilities as disclosed herein, but at least with the capability to execute computer-readable instructions. These electronic devices are described in detail below and may include specific configuration to perform the functions herein. Such electronic devices may include personal computers, tablets, notebooks, smartphones, wearable computers, voice-assistants and related devices, handheld messaging devices, set-top boxes, electronic book readers, and the like. Each of these electronics devices may be configured to include a browser or a stand-alone application that is capable of being configured in the manner of this disclosure. In one embodiment, content providers 106 may use one or more of content servers 116 to run tests on hardware and software features or services offered in the example environment 100. Users or consumers of electronic or online products and/or services may use the client devices 102 to interface with a website providing such content.

The network(s) 114 can include any appropriate wired and/or wireless network, including an intranet, the Internet, an Ethernet, a cellular network, a local area network (LAN), or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture can depend at least in part upon the type of network and/or environment selected. Protocols and components for communicating via such a network are well known and will not be discussed herein in detail. Communication over the network(s) 114 can be enabled via wired or wireless connections and combinations thereof. In this example, content server 116 may include one or more local servers in communication with each other and with other remote servers via the network 114. In an example, the content server 116 includes a web server for receiving requests and serving content from the client devices 102 and/or the content providers 106. In response thereto, although for other networks, an alternative device serving a similar purpose as any one of the content server 116 could be used, as would be apparent to one of ordinary skill in the art upon reading this disclosure.

In a further example, the content providers 106 may include a content console 108 for communicating with the content server 116. The content console may be an internet-enabled application (e.g., browser and/or stand-alone application) that is configured to execute on the content provider 106 and is configured to communicate with the content server 116 in the manner described herein. The communications between the content server 116 and the servers and devices of FIG. 1 can utilize an interface or networking component or layer 118, such as a network interface card or a wireless interface. In some embodiments, the system architecture is maintained internal and confidential between the content providers 106 and the content server 116 during the configuration stages. Accordingly, one or more components or modules in the system architecture 100 are isolated from external influence by any known security methods, including firewalls, during configuration stages. Alternatively, sections of the one or more components or modules in the system architecture 100 are available within one or more content providers 106. In yet another alternative implementation, sections of the one or more components or modules in the system architecture may be secure, while other sections of the one or more components or modules may be available in the public domain to interface with client devices 102. In accordance with such alternate implementations, one or more components or modules may also be virtual machines or operate in a virtual environment for performing one or more of the features disclosed herein.

Further, in the example environment 100 of FIG. 1, content such as real-time or dynamic search results can be provided for queries received from the client devices 102. For example, queries can be addressed in real-time or dynamically via the server modules 124, which may include machine learning capabilities, a display content generator 138, and a new item modifier 136, among other such options. Modules 124 and 136 may cooperatively function under two or more modes. In one of the modes, the machine learning features of select modules 124 (e.g., crawler/webpage analyzer 132 and query reviewer 130) may constantly improve upon itself using each new query and newly modified content as feedback to their respective machine learning algorithms to ensure a robust functionality. Machine learning aspects are discussed in more detail elsewhere herein. Such a mode may be referred to as a training mode. In an application of neural networks for the machine learning operations, the machine learning aspects of these modules may train one or more neural networks with each new query and newly modified content while running active operations with a copy of an active previously-trained neural network. Once the new query and newly modified content has been trained to one or more inactive neural networks, the one or more inactive neural networks may be activated and the previously-trained neural networks may be inactivated for training. Alternatively, bulk queries and modified content is also available to train one or more neural networks during an assigned downtime.

In content server 116, the queries from client devices 102 may be received via query receiver module 126. Results webpage(s) or display content can be generated by a display content generator module 138. In an example, the display content generator 138 is a module that includes HTML® and various dynamic scripts that are formatted for rendering on the client device 102. The dynamic scripts enable additional requests for information to populate an HTML®-formatted page upon rendering on the client device, for instance. In addition, content server 116 includes a query monitor 128 for determining if there is a spike in the received queries. In an example, such a spike may be a general increase in search traffic or an increase in specific search queries. Query reviewer 130 is a module that may be separate or part of the query monitor 128, and that reviews the queries themselves to determine if any of the queries (e.g., from a detected spike) have common textual features. In some embodiments the reliance on semantic relationships in the machine learning process may still indicate such a query as indicative of a possible new item release. For example, two or more words in a query form a basis for identifying similarity and/or semantic relationships with similar groupings in other queries during the spike. With two or more words take in different combinations from a query for comparison with other queries, a reliance on a single word pair may be eliminated for further robustness in the similarity matching process.

Furthermore, noun identifiers are weighed preferably over articles and other grammar portions from the queries. The two or more words are analyzed against individual words or similar groupings across multiple queries since the spike occurred. In a process to eliminate false positives, the two or more words identified as similar and/or semantically similar may be compared against prior queries or content stored in the content database 120 to ensure that the queries do not relate to existing items or products forming part of the content in content database 120. Indeed, if no content is seen as matching, then it is likely that the queries relate to a new item. Each word in a query may be taken with another word of the query to find correlation to the word pair. In an alternate aspect, from one query detected during the spike, two words are taken as a single word and then combined with one or more words to find correlation between the grouping and other groupings from other queries during the spike. The semantic relationships and/or similarities are comprised of measures that are then applicable to provide measurable representations for semantic relationships and/or the similarity.

The content database 120 in this example can store content from content providers 106 (e.g., product information, service information, advertisement, and other related information; news, social media, and other product/service related content from which information is gleaned for use in the present system). Further, advertisement networks may provide paid content, and users with computing devices 102 may send queries or interact with the content server to access the paid content (e.g., advertisement) or unpaid content (e.g., digital information for products and services that may be referred to or available for purchase via the content server). In some embodiments a content server hosts its own services for providing content, such as for an electronic retailer. In yet another alternative implementation, the content providers may utilize one or more of its own computing systems to provide a website or web-enabled application that is accessible through the network 114. In such an implementation, the content server may provide referral links for content to the content providers' websites for purchase of associated products and/or services.

The content providers' website or web-enabled applications may offer opportunities to present additional, and in some instances, paid content to users accessing the website. For example, electronic advertisements or other digital media may be provided for products based on the analysis of queries and news websites described herein. The computing devices and/or systems for each of the content server, content providers, content webpages (e.g., news and social media), and users with computing devices will each generally include memory for storing instructions and data, and at least one processor for executing the stored instructions that configure the computing devices and/or systems to perform the features disclosed.

When a user with a computing device 102 uses the computing device to access content from the content server or content providers, the relevant content provider can send, either directly or via the content server, responsive content to the computing device 102. This access for content can include various requests or searches to find specific content hosted by the content server or content providers. Further, a content server may be a special status host and may have special access ability to index content from various content providers that are hosted or released to content webpages. This process allows at least a portion of new content to be indexed to provide sufficient new information to interested parties in future searches via content server. Accordingly, a content server may include cookies, authentication certificates, or signed certificates to enable such access to protected content hosted in content webpages.

As mentioned, an entity such as an electronic retailer or content provider might want to advertise with other entities or providers, such as search engine providers. The advertising can come in many different forms. In one approach an entity can purchase sponsored ads. A sponsored ad may include graphical and text content, for example, that may be displayed in a specific area, or set of areas, of a search results page. The advertiser can submit a bid for a keyword or query, and an advertiser with a winning bid will have that sponsored ad displayed when the corresponding keyword or query is received by the search engine. The advertiser will then generally pay on a per-impression or per-click basis, among other such options. For a per-impression approach, the advertiser will pay for each time the sponsored ad is displayed on a search results page (or other agreed upon location). For a per click approach, the advertiser will pay when a user "clicks" on an ad by performing an action to select or follow the ad, which causes corresponding content to be provided for presentation to the user. In some embodiments an advertiser will pay a first amount for an impression and a second amount for a click, etc.

Figure 3:
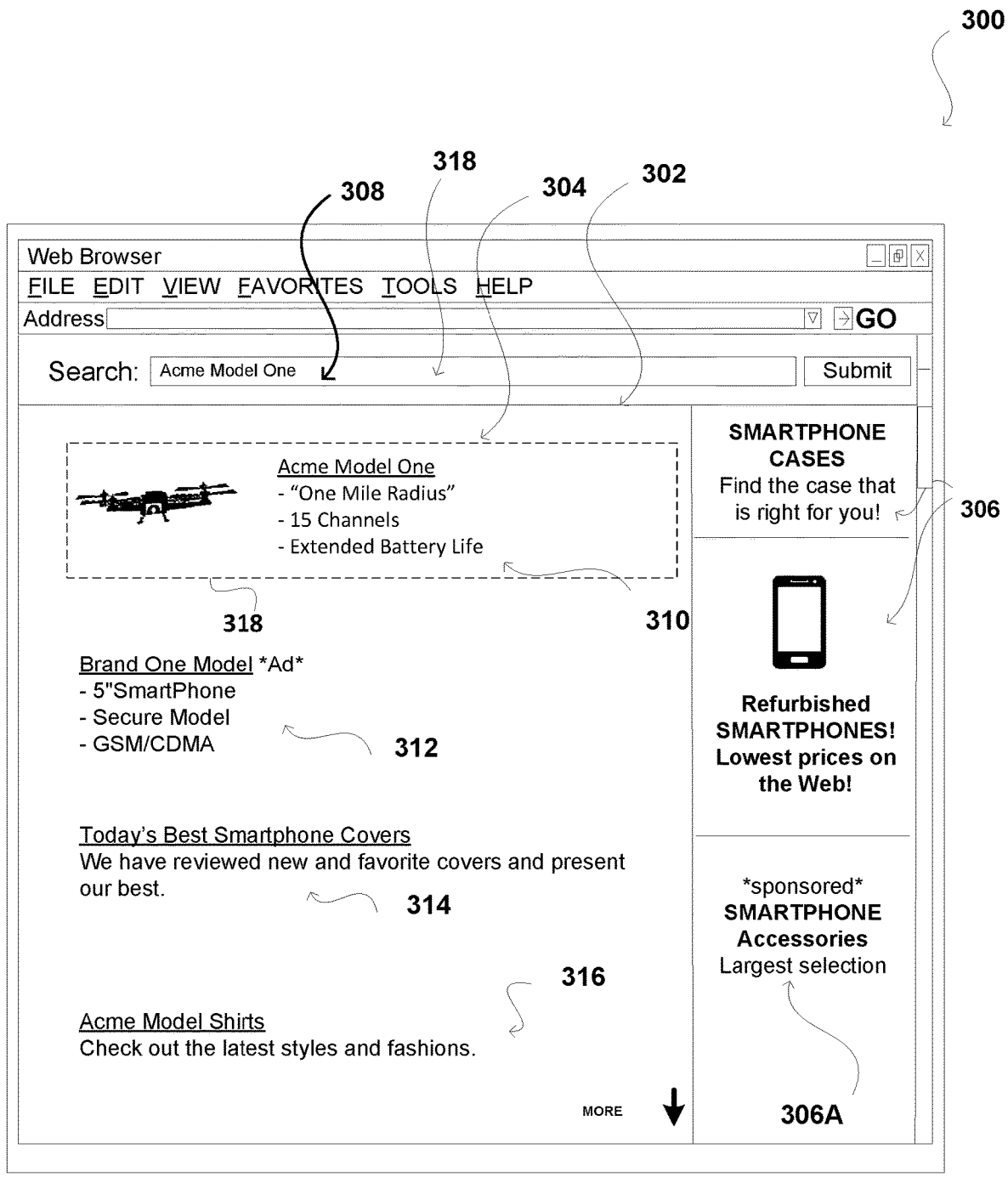
FIG. 3 illustrates an example search results page that can be analyzed in accordance with various embodiments.

An advertiser can also take advantage of a paid search approach, wherein the advertiser (or other entity) can bid for keywords or queries to generate sponsored results or links. As opposed to sponsored ads, sponsored results can have an appearance similar to that of normal or "organic search" results, including a URL and text in a similar format, except in many situations having some indicator indicating that it is a paid or sponsored result. This may be beneficial in at least some situations, as at least some users will be more likely to select search results (paid or unpaid) than advertising, and being one of the first search results can guarantee that the result is shown near the top of the first page or "above the fold," such that it is one of the first results the user sees without any navigational action needed on the part of the user. Examples of sponsored ads and sponsored results are illustrated in FIG. 3.

It can often be difficult to determine how much to bid for a particular keyword. One approach is a trial and error approach, where an advertiser will keep increasing the bid until the advertiser wins the keyword for a period of time. Similarly, the advertiser might keep decreasing the bid until the advertiser no longer wins the keyword, such that the advertiser knows the approximate minimum amount to be bid to win that keyword at the present time. Such an approach can be difficult to manage, particularly for a large number of keywords. Further, the appropriate bid amount can change significantly over time based on a number of different factors, so determining the correct amount at any time can be a complicated and inaccurate process.

Further complicating the situation is the fact that search results determined to be relevant for various keywords can be provided, for at least many search engines, without an advertiser bidding or sponsoring any of those keywords. In this instance, the content will be ranked using a conventional relevance or ranking mechanism, as known for use in various search engines. This "free" or "unpaid" search option can still result in user traffic, and some amount of revenue or compensation, without costing the entity any advertising revenue. The value of such search, however, can depend largely on how close to the top ranking the content receives. A highest ranked result can have a high probability of selection, with lower ranked results dropping off in probability accordingly. Thus, if an entity wants to improve the likelihood of traffic for a link of interest, such as to a product page, the entity may wish to bid for the keyword. The amount that the entity should bid for the keyword in at least some embodiments should be a function of the increase in traffic, profit, or another such parameter when bidding for a keyword through a paid search or not bidding through an organic search. Unfortunately, since such an approach may result in lower average bids many search engine providers do not expose much of the information that would be needed to make an accurate bid price decision based on the relative performance of paid and organic search.

Accordingly, approaches in accordance with various embodiments can utilize a bidding system that determines appropriate bid prices based upon the relative performance of different types of advertising. This can include, for example, determining an amount of recovered interaction, or "recovery," between organic search and paid search results. This can include, for example, a customer using a client device 102 to contact a bid manager 140, which may be associated with the customer or a provider, among other such options. The bid manager can use a bidder 142, or other such system or service, to determine an appropriate bid price or data for various keywords or queries, among other such options discussed and suggested herein. The bid data can then be provided to the customer, which can adjust its bid submissions accordingly.

As mentioned, in applications such as search engine marketing, advertisers bid on keywords for which they want to show advertising. The advertising is then shown on a search results page of a search engine, such as Google®, Baidu®, Yahoo! ®, or Bing®. These ads are placed above the organic search or organic search (OS) results, also known as organic search blue links. Traditionally, when a bid is placed on a keyword, the advertiser is not aware of the OS blue links that may be the same as, or similar to, the ad links for which the advertiser paid. The paid-search ad links may be exactly the same as the top OS blue links. This is often the case for well-known or popular products. If an advertiser wishes to place bids in a manner that is aware of its OS rank for the same keyword, various search engines do not provide at least some of the data that would facilitate this determination. Since advertisers cannot readily determine their OS results, it can be it intractable for the advertiser to adjust its bid accordingly. Advertisers can thus end up paying for ad placements, such as for paid search (PS), sponsored search, product listings, or shopping ads, that do not leverage their positions and ranking in organic search links.

In many instances, the ability of a keyword to recover traffic from OS is strongly correlated with its OS ranking. As an example, if an advertiser is showing an ad when the keyword is present as the highest ranked option, or appears as the first blue link, in organic search, only 45% of the total traffic generated by this ad may be incremental and the remaining 55% recovered from organic search. Similarly, for keywords where organic search is ranked second, or appears as the second blue link, only 60% of the traffic may be incremental in one example while the remaining 40% may be recovered from the organic search results.

In at least one embodiment, a bidder 142 can perform optimized bidding for blue link search results. The bidder, which can be a module, system, service, component, algorithm, or process as discussed and suggested herein, can provide information that enables entities such as advertisers to adjust bid values using determinations that are recovery-aware. In at least one embodiment, if an advertiser wants to bid on a given keyword using a bid optimization service, the advertiser can determine their recovery propensity and place a bid such that it maximizes the net return, such as profit or revenue per click, per unit of currency or compensation spent on placing the ad. As mentioned, this can also include maximizing usage of display space on a customer's screen or display, so that redundant information is not provided. Using the signal for multitude of keywords, such a service can enable validation of an entire portfolio of keywords on which an advertiser would like to bid. The bid manager 140 can utilize information from a rank tracker 144 or rank tracker service, which can be provided by a third party of any of the entities providing other components or services discussed herein.

In at least one embodiment, an advertiser can provide a portfolio of keywords as input to a bid optimization service. The service can then, based on simulated or experimental data, determine a recovery propensity for each of the keywords in the portfolio. In order to determine the recovery propensity, the bidding service can determine the OS rank and other characteristics, such as the corresponding uniform resource locator (URL), of the advertiser's page ranking for that page. Considering that conventional search engines do not allow large-scale rank tracking, the bidding service can utilize a predictive model, such as a trained neural network, that predicts or infers the rank for a keyword on a given search engine. A rank prediction service or network can provide a prediction of the most relevant URL and rank for a given keyword. This information can then be provided as input to a recovery-valuation system that can determine the recovery propensity for the keyword.

Figure 2:
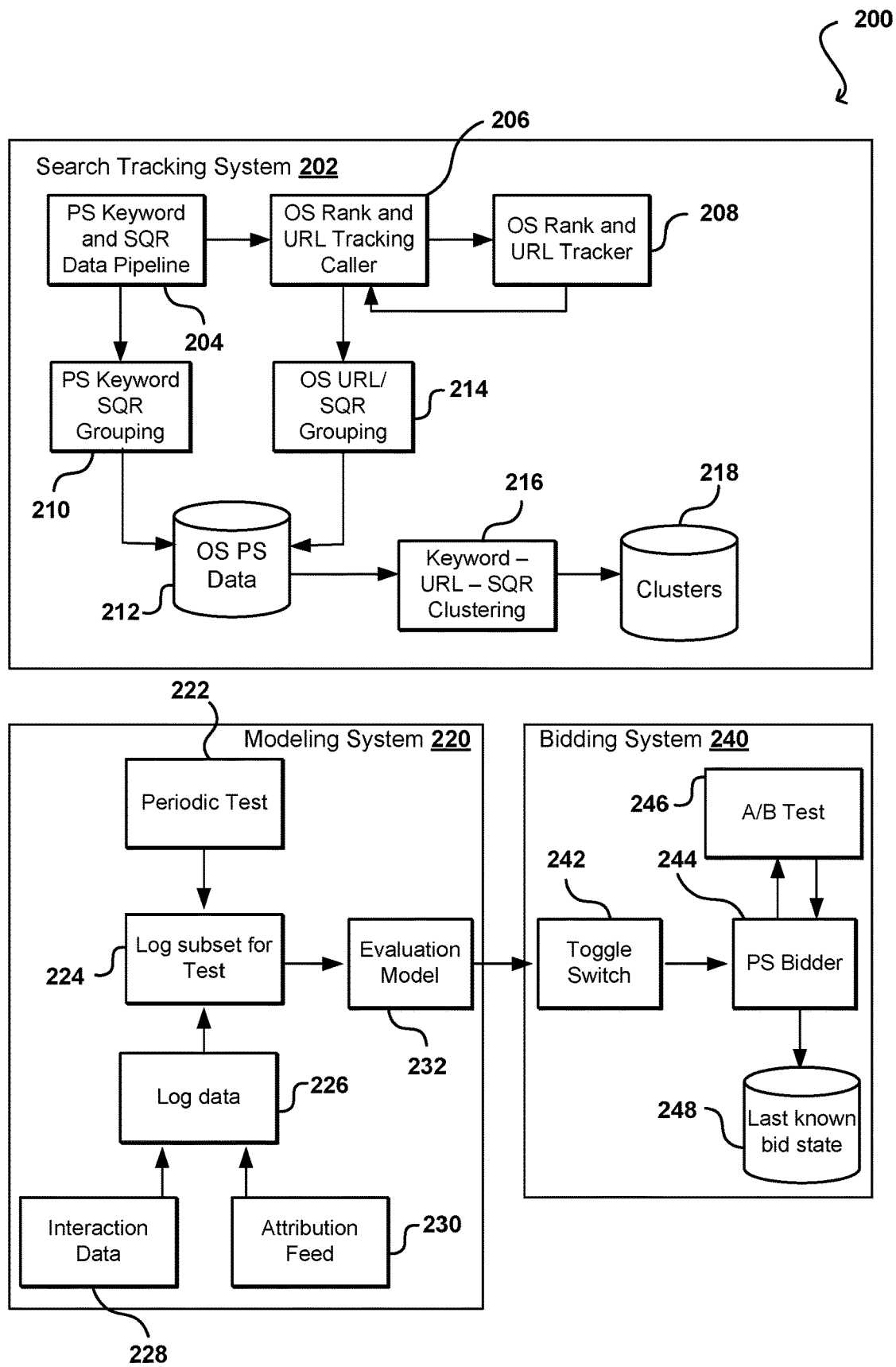
FIG. 2 illustrates an example bid optimization and management system that can be utilized in accordance with various embodiments.

FIG. 2 illustrates components of an example bidding service 200 that can be utilized in accordance with various embodiments. As mentioned, such a system can perform functions such as to determine and/or adjust bid amounts, or related information, to use to bid on content or opportunities such as paid search. As mentioned, such a system can attempt to optimize for various goals, such as to maximize profit or views, among other such options. In at least one example, the revenue or performance of advertising can be determined for organic search, paid search, and shopping advertisements, although other streams of advertising can be considered as well within the scope of the various embodiments.

In this example, the bidding service includes a search tracking system 202, an evaluation model 220, and a bidding system 240 (or subsystem), although other components can be utilized as well, and the illustrated components in some embodiments may be provided by multiple providers or entities. The search tracking system 202 in this example can perform keyword and URL tracking for both paid search and organic search. In PS, the system can bid on keywords and measure the channel performance for these keywords. A goal of bidding service can be to adjust the bids on these keywords such that the bids are aware of OS substitution. In order to build and measure recovery-aware bidding, the search tracking system 202 can obtain information regarding OS and PS Keyword, (search query report) SQR, and URL data, and can cluster that data into meaningful units that can then be used to adjust bids. In order to understand OS substitution, the system can track OS rank and conversion by SQR. A search query report can be used to locate new keyword opportunities and fine-tune a negative keyword list. An example SQR can contain actual search terms that users searched when they found and clicked on a particular ad or result. By default, a conventional search engine will not supply keywords for URLs that rank on its OS landing pages, such that the system will need to be able to track OS rank and URL. In at least some embodiments, use of a OS rank and conversion tracking service can extend beyond its use in determining recovery-aware bid adjustments or amounts. A OS rank and conversion pipeline can also be used for OS landing page optimization, as well as recovery rate calculation.

The example search tracking system 202 includes a PS keyword and SQR data pipeline 204 and grouping component 210. These components can extract a list of PS keywords and search queries (SQRs) associated with the keywords. An advertiser might have millions of unique keywords in a portfolio, and for each keyword there will be one or more SQR values, so the total SQR will likely be larger than total keywords. This data may sit in multiple locations and need to be joined to access relevant SQR and keyword data. A join between SQR and Keyword could be many to many mappings. An SQR can trigger from different keywords and a keyword can trigger multiple SQRs in some embodiments. At any given time, it may be at least difficult to determine all the SQRs associated with a given keyword. These modules can pick up SQR reports periodically and group, or reassign grouping, based on the new information. The output of these components can be a pair of keyword-SQR values. As new keywords flow in and new search terms emerge, these changes can be captured in some embodiments by re-running the SQR pipeline to update the keyword-SQR mapping.

The service also includes OS rank and URL calling 206 and grouping 214 components. These components can obtain the data from the OS rank and URL tracker, and can collect URL and rank for all SQR values. There may be a maximum capacity (e.g., millions of pages per week) for a rank tracker. Following a first round of data collection, these components can have the intelligence to determine the frequency of tracking for different SQRs. Although rank and URL may be needed for SQRs in at least some embodiments, it may not be necessary to track keywords below a certain rank at a high frequency since the probability of a lower ranked page moving into a top rank may be low. These components can work under constraints of limitations of the rank tracker. These components should also be able to determine when there is no first page ranking URL for a given keyword for the advertiser. These components can start with a default rank tracking cadence for keywords based on their rank and can potentially prune this logic based on the probability of frequency of change in rank/URL for a given SQR. In one embodiment the system only tracks rank and URL for OS. In other embodiments there may be other key elements of the page returned by the rank tracker that can be extracted and processed.

A OS rank and URL tracker component 208 can be used to obtain OS information related to each SQR query. In one embodiment key information includes the URLs of pages ranking first, as well as page rank and other relevant information about the page, such as may include the presence of maps, snippets, etc. In one embodiment the system can focus on tracking rank and URL, while other embodiment can utilize other information relevant for the system. In various embodiments, rank is the largest factor influencing OS substitution. This component should be scalable in at least some embodiments. The system also includes a storage repository 212 for storing OS and PS data that will be consumed by a clustering algorithm. A clustering module 216 can use a clustering algorithm to build a cohesive unit of keyword-URL-SQR grouping that can be acted upon together when turning off bids. Multiple SQRs can form a keyword, and a given SQR can have multiple URLs. One goal of an example clustering module 216 is to group Keywords-URL-SQRs in such a way that each group can be handled as one unit for which an entity can measure performance and apply bids. Without clustering, it may be difficult to attribute performance data from a URL to a keyword, such that it can be important in at least some embodiments to cluster URLs related to one SQR into one group. The system also includes a storage repository 16 for storing OS and PS data that will be consumed by the clustering algorithm.

Once the keyword level data is obtained or determined using the search tracking system 202, this data can be provided as input to a model evaluation module 220, system, or service, to generate a recovery-aware bidding evaluation model 232. The evaluation model 232 can leverage results from an off test to understand for which keyword clusters turning off PS generated net positive performance, such as increased revenue. Based at least in part upon this evaluation, the evaluation model 232 can suggest a list of keywords for which bids should be reduced, or even turned off or left unsubmitted.

In one embodiment, the evaluation model 232 is built using data from an off test, or where paid search bidding is turned off or declined for a number of customers or keywords, among other such options. In at least some embodiments an off test can be a periodic test. This can be run, for example, for a subset (e.g., 10%) of a region in which the bid is to be utilized, and run for a determined period of time such as a number of weeks. A periodicity and size of the test can be adjusted based on a result of the model. The test in a true A/B setting can help to understand keyword recovery. Such a test can also help to determine a recovery propensity of each keyword cluster. A predictive model can be used to supplement the results of such a test. A predictive model can be used to predict recovery propensity of a keyword cluster based on information such as changes in ranking and page layout. In at least one embodiment, a predictive model can be run every time the rank for a OS keyword is tracked.

The tracking in this example can be performed using OS and PS performance tracking components, such as an interaction data module 228, an attribution feed module 230, a log data module 226, and a log subset for testing module 224. The interaction data may include data (e.g., click stream data) resulting from a user clicking on, or otherwise interacting with, a link or other such element. OS and PS performance can be tracked in the context of an A/B test. From a turn off test, a list of customer identifiers can be obtained that are part of treatment regions and/or that are port of the control regions. For these customers, conversion and URL can be tracked using click and optimization log data. The data can be subset to the treatment and regions by using the list of customer identifiers. The test module 224 can join this test data with PS/OS keyword cluster data generated by the clustering module 216. With Rank and URL tracking, a next step can be to obtain the OS conversion by URL. One way to do this is by joining rank tracker data with attribution feed (optimization or reporting) and click data logs, which can provide performance data by URL for OS. A second step can be to join the data with a OS rank tracker, which can help to generate a view of OS/PS data. Similar to OS, PS SQR level conversion can be tracked as well. PS keyword level conversion data can be obtained from a search engine, and it can be combined with data from a search engine provider. A PS keyword metrics data tracker in some embodiments can exclude existing known locations that have an experiment running.

Output of the evaluation model can include one or more bid suggestions for a cluster of keywords, which can then be provided to a bidding system 240. In one embodiment the output can be a binary output to turn on, or turn off, bidding for specific keywords or clusters of keywords. In other embodiments the output can include information useful for adjusting bids, such as suggested bid values or bid modifiers as discussed and suggested herein.

The example also includes a bidding system 240, although as mentioned a bidding system or bid generator may be a separate system or service in at least some embodiments. The bidding system 240 can accept output from the evaluation model, which may include bid adjustment factors or other such values as discussed herein that can be used to adjust the bids generated by one or more valuation systems. The example bidding system 240 includes a toggle switch 242 that can be used to separate out recovery-aware input for the bidder. This toggle switch can be turned on or off as needed. A paid search bidding component, or bidder 244, can ingest the recovery-aware data and use this data to determine bid modifications. The bidding system can ingest the recovery-aware bid input and generate data regarding a modification of the bids. The modeling system 220 in some embodiments will provide a bid multiplier for a keyword, and the bidding system 240 can apply that multiplier on top of the valuation system keyword bid output. Instead of rolling this approach out to an entire region, for example, an AB testing system 246 can be used in at least one embodiment. The testing module is experiment-based in at least one embodiment, since it is necessary in this example to modify the bids by different locations for keywords. Details can be provided with respect to different locations available for testing, and the testing system can, in-turn, provide different bids to be synced to different locations When turning off bids for a keyword, the system in this example can determine the last known bids for that keyword, which can be stored in an appropriate repository 248. This information can be used when turning off the recovery-aware billing system or when the model recommends that a keyword should not be bid down anymore, and the system should be able to restart the keyword with a known bid state.

As mentioned, in some embodiments such a system can also be utilized to include information for shopping ads. To support shopping ads, a system in accordance with one embodiment can utilize a clustering algorithm expanded to include item-keyword clustering. In shopping ads, the advertiser can bid on items or products instead of keywords. A search engine provider can provide the list of keywords that show ads on particular products. The evaluation model can also be expanded to include shopping ads.

FIG. 3 illustrates an example search results page 300 that can be analyzed in accordance with various embodiments. The interface illustrated can be a web browser or a stand-alone application for interacting with display content 302 of an entity such as an electronic retailer. A user may search or interact with the display content via a search field 308. A query 318 is provided in the search field 308 in one implementation of the searching or the interaction with display content. When a submit option is selected, the search may be initiated and processed on the computer or on a server as discussed herein or known for such purposes. In example 300 of FIG. 3, a query 318 for ACME MODEL ONE is entered into the search field 308, and the search results are provided in the results section 304 of the display content 302. As illustrated, there are three search results 312, 314, 316 on display, with an indication for more results (e.g., down arrow with text "MORE" at the bottom of the page 302 or the grey scroll indicator on the right of the page 302) if the display content was scrolled down. A top result 312 is a paid result, or paid blue-line result, evidenced by the word *Ad* next to the URL. Result 316, while illustrated in the search results may load after the existing results—i.e., results 312, 314, are loaded. A sponsored ad 310 is also displayed above the results. Categories within the search results may be presented on one side (not shown) of the search results, while sponsored content may be displayed on another available area 306. A given category may be a new category based on a learning of the new item type—DRONE and the commonly used terms associated with DRONE, such as TOY. As a result, the display content may be modified to include a new category and the corresponding new item result 316. Any or all of the information on the page can constitute a characteristic of the page as discussed elsewhere herein.

As mentioned, an advertiser might utilize a organic search and hope that their search result shows up in a top three results or above the fold, such as for result 316. The advertiser might instead bid for a keyword such as "ACME" or "Model One" in order to have a result displayed at the top of the results, such as for result 312. An advertiser might also pay for a sponsored ad, such as for "result" 310 or one of the other sponsored ads 306A on the page. As mentioned, bidding can become expensive, particularly for large numbers of keywords. Further, an advertiser may not want to submit a large bid for a sponsored ad if a organic search will cause the corresponding link to be ranked in the top few slots. Bid determining and optimizing approaches discussed herein can help to ensure that an advertiser is more closely meeting business goals through the bidding process, such as to drive traffic, maximize revenue, or optimize profit, among other such options.

Figure 4:
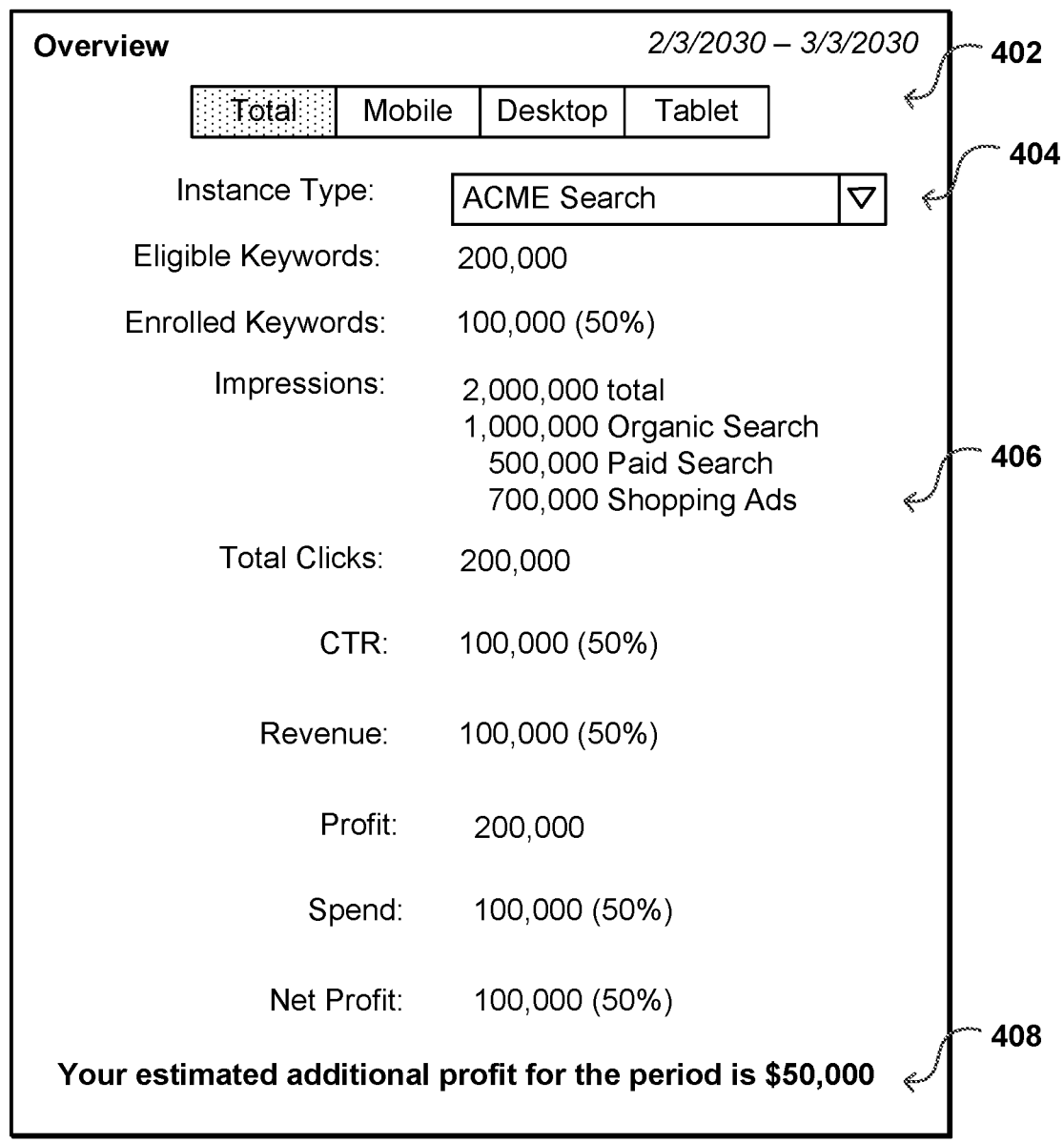
FIG. 4 illustrates an example overview page that can be generated in accordance with various embodiments.

FIG. 4 illustrates an example interface 400 that can be presented in accordance with various embodiments. In this example, information is provided that will enable a customer or other authorized user to obtain information regarding the performance of a recovery-aware bidding approach. In the interface of FIG. 4, there are options 402 to enable a customer to obtain data for different types of devices, such as for mobile devices, desktop devices, tablets, and the like. The customer can also select an option to view the overall results for all tracked types of devices. The customer can also select an option 404 to be able to select specific search providers for which to obtain results or projection data, etc. In this example, the customer has selected to view total data 406 for a specific search provider. The interface provides the user with information about the total number of keywords eligible for use with paid search, such as may correspond to a set of identified keywords or keywords that satisfy a selection or eligibility criterion, among other such options. The information can also provide information about the number of keywords that are enrolled in paid search based on the recovery aware bidding analysis. In this example, a determination is made that around 50% of the keywords should be enrolled in paid search, with the other 50 relying on organic search in this example.

In this example, data about the performance of the keywords is provided. This includes the total number of impressions, or times in which an ad or sponsored result was provided for display or viewed. From these impressions, the number of impressions by organic search, paid search, and shopping ads are provided, although other options or combinations can be provided as well. The total number of clicks is provided, along with the click-through rate (CTR). Financial information is provided as well, which in this case includes information about the revenue generated, profit, amount spent on the advertising, and the resulting net profit. The net profit is shown with a percentage, which is the percentage of profit that is a result of utilizing recovery-aware bidding. In this case, 50% of the net profit 408 is due to recovery-aware bidding, for an increase of $50,000. The customer can then see not only the total profit, but how the profit compares to the profit that would have been obtained without recovery-aware bidding. As mentioned, however, some customers may prefer to optimize for other parameters, such as total impressions, downstream impact (e.g., long-term or short-term performance impact), or CTR, such that the information provided may be selected and/or organized in different manners for different customers or situations.

FIG. 5 illustrates an example interface 500 that can be generated in accordance with various embodiments. In this example, a query search report 502 is provided that breaks down information by query. For each query, information can be provided such as whether the keyword is enrolled in paid search, a related item, the organic search rank, the paid search rank, the item rank, and other such information, as may relate to CTR, spend, revenue, cluster, and the like.

FIG. 6 illustrates an example interface 600 that provides information about specific clusters of keywords. In this example, a customer can select options 602 to view specific clusters, and can obtain information 604 about that cluster. In this example, that information can include the keywords assigned to that cluster, the items associated with that cluster, the average organic search ranking, and the average paid search ranking. The interface provides a recovery factor for the cluster, which provides a measure of recovery for the cluster as discussed herein.

FIG. 7 illustrates an example interface 700 providing information about specific queries. There can be options 702 provided that enable a customer to pause, delete, or modify SQR as discussed herein. In this example, the interface can provide information about a specific query, here "hammer," and information indicating that the bidding for this query is optimized for recovery-aware bidding. Information 704 provided can include information about the associated keywords and items, as well as information about the paid and organic search ranking. Additional information 706 can be provided indicating information about the pages on which the results or ads are displayed. In this example, the information includes information about items present on the page, as well as whether the result appeared above the fold or on the first page, the relevant recovery factor, and various other potential characteristics. This example display also provides a breakdown 708 to enable a comparison of optimized and non-optimized situations, such where only paid search is used versus where a combination of at least paid and organic search is used.

Figure 8:
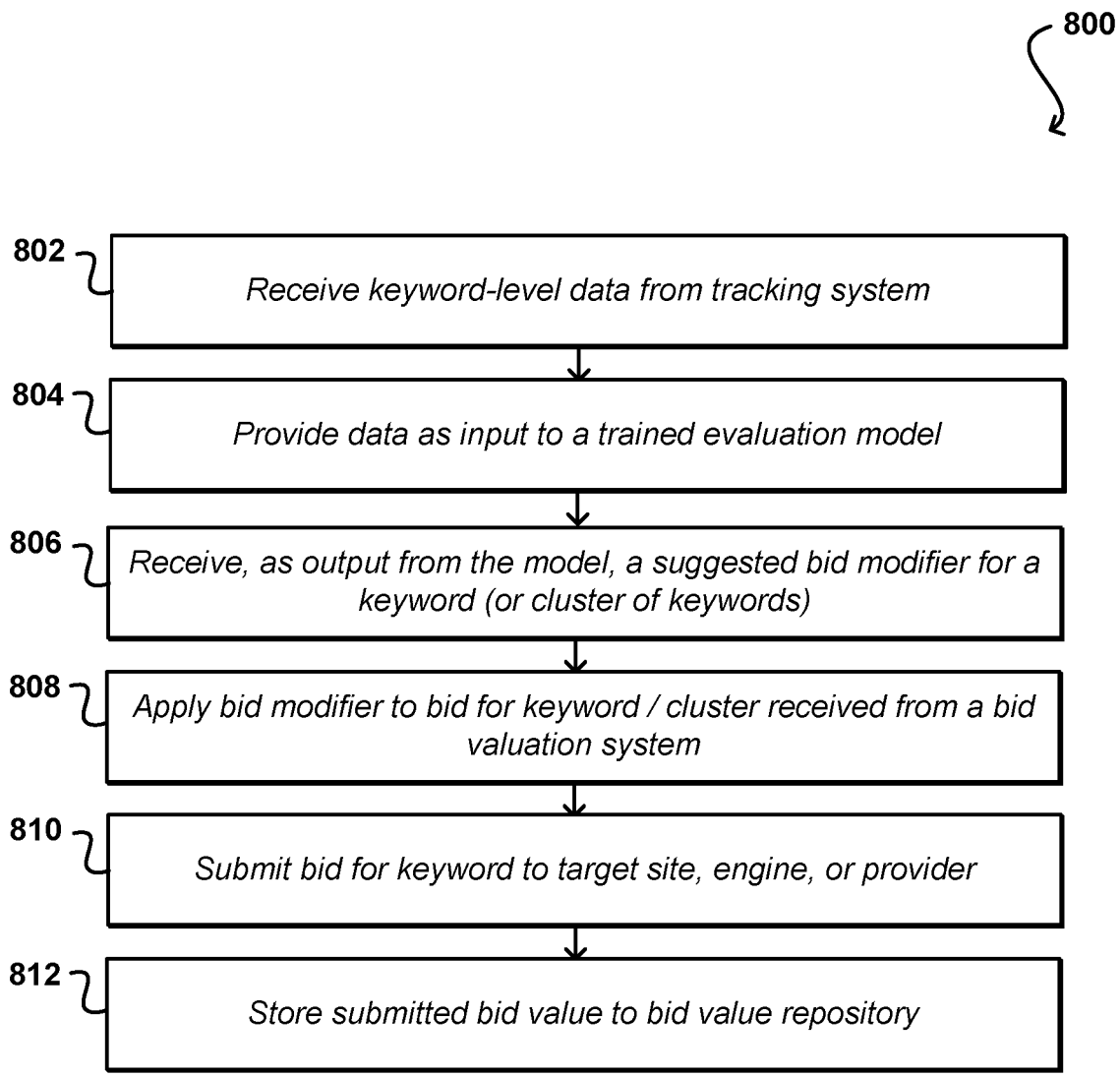
FIG. 8 illustrates an example process for determining and submitting a recovery-aware bid that can be utilized in accordance with various embodiments.

FIG. 8 illustrates an example process 800 for determining recovery-aware bid values that can be utilized in accordance with various embodiments. In this example, keyword-level data is received 802 from a tracking system. This can include tracking and other data for both paid and organic search, for specific keywords or clusters of keywords as discussed herein. Other information can be obtained as well, as may relate to sponsored ads and the like. The data can be provided 804 as input to a trained evaluation model. The process can then receive 806, as output from the model, a suggested bid modifier for a keyword or cluster of keywords. As discussed, the model can use information such as the recovery propensity to determine adjustments to a current or proposed bid price, with the output of the model in this example then being an inferred or predicted bid modifier. The bid modifier can then be applied 808 to a current or proposed bid for the keyword or cluster, such as a proposed bid from a bid valuation system. The application of the modifier can include multiplying the bid value by the modifier, where a value of 1.0 causes no change, a value between 0 and 1 reduces the bid, a value above 1 increases the bid, and a value of 0 causes no bid to be submitted. In some embodiments there may be a minimum bid threshold such that a bid will not be submitted if the modified value is below the minimum bid threshold, and/or a maximum bid threshold such that a bid for a keyword may not be modified to go above the threshold value. The threshold may vary by keyword or cluster, types of items, page characteristics, and the like. The bid can then be submitted 810 to a target site, search engine, provider, or other such entity, as discussed herein, for the relevant keyword or cluster of keywords. The bid value can also be stored 812 to a bid value repository, such that the last known good bid value can be recovered if necessary.

Figure 9:
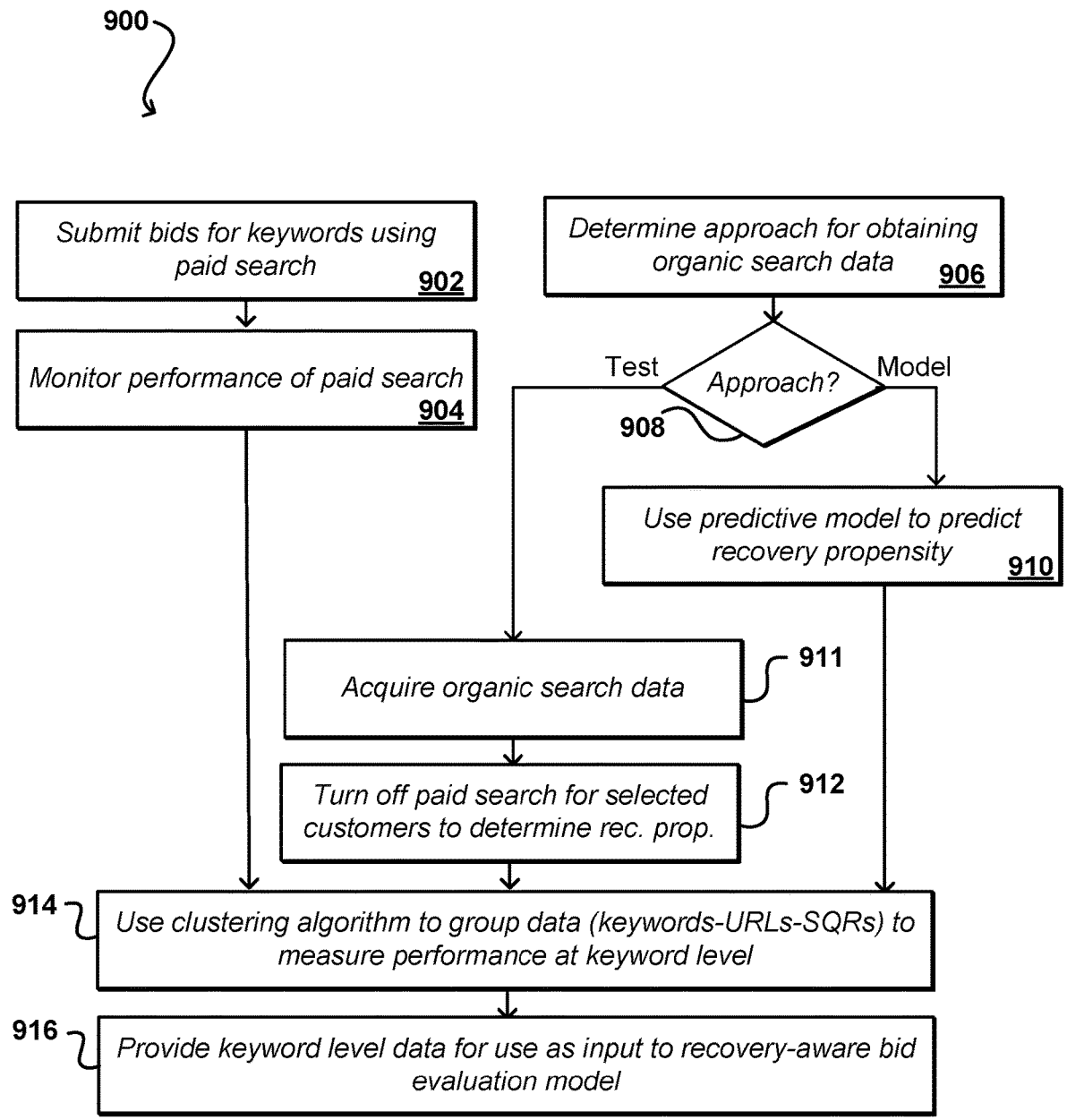
FIG. 9 illustrates an example process for determining keyword-level data based on available paid and organic search data that can be utilized in accordance with various embodiments.

FIG. 9 illustrates an example process 900 for obtaining keyword-level data that can be provided as input to such an evaluation model. In this example, data is obtained for at least paid search and organic search for a given keyword or cluster of keywords. The data can be obtained in sequence or in parallel, among other such options. For paid search, bids for a number of selected keywords can be submitted 902 using paid search options for one or more search engines or other such providers. The performance of the paid search can then be monitored 904, such as by monitoring resulting views, links, clicks, purchases, profit, and the like. Since many providers do not expose information for organic search, an advertiser can determine 906 the approach to use for obtaining the relevant organic search data. This can include testing, prediction, or a combination thereof. If it is determined 908 that a testing approach should be used, then organic search data can be acquired 911, such as through mining or purchasing from a third party service, among other such options. In some embodiments, paid search can be turned off 912 for selected customers, such as customers for a given region, language, or application, and the change in performance can be monitored for those customers. The difference in performance for paid and organic search provides an indication of the recovery propensity as discussed herein. If a modeling approach is to be used, such as where the advertiser does not want to lose revenue, profit, or impressions due to an off test, a predictive model (such as a trained neural network) can be used 910 to infer or predict the recovery propensity. As mentioned, in some embodiments an advertiser may utilize both, using the predictive model to supplement the limited testing data. Once the data is obtained for organic and paid search, a clustering algorithm can be used 914 to group data to measure performance at the keyword level, such as by grouping keywords-URLs-SQRs. This may include, in some embodiments, tracking search rank and conversion by SQR, performing SQR and keyword mappings, determining a frequency of tracking for different SQRs, and tracking rank and URL data in some embodiments. This keyword-level data can then be provided 916 for use as input to a recovery-aware bid evaluation model.

Figure 10:
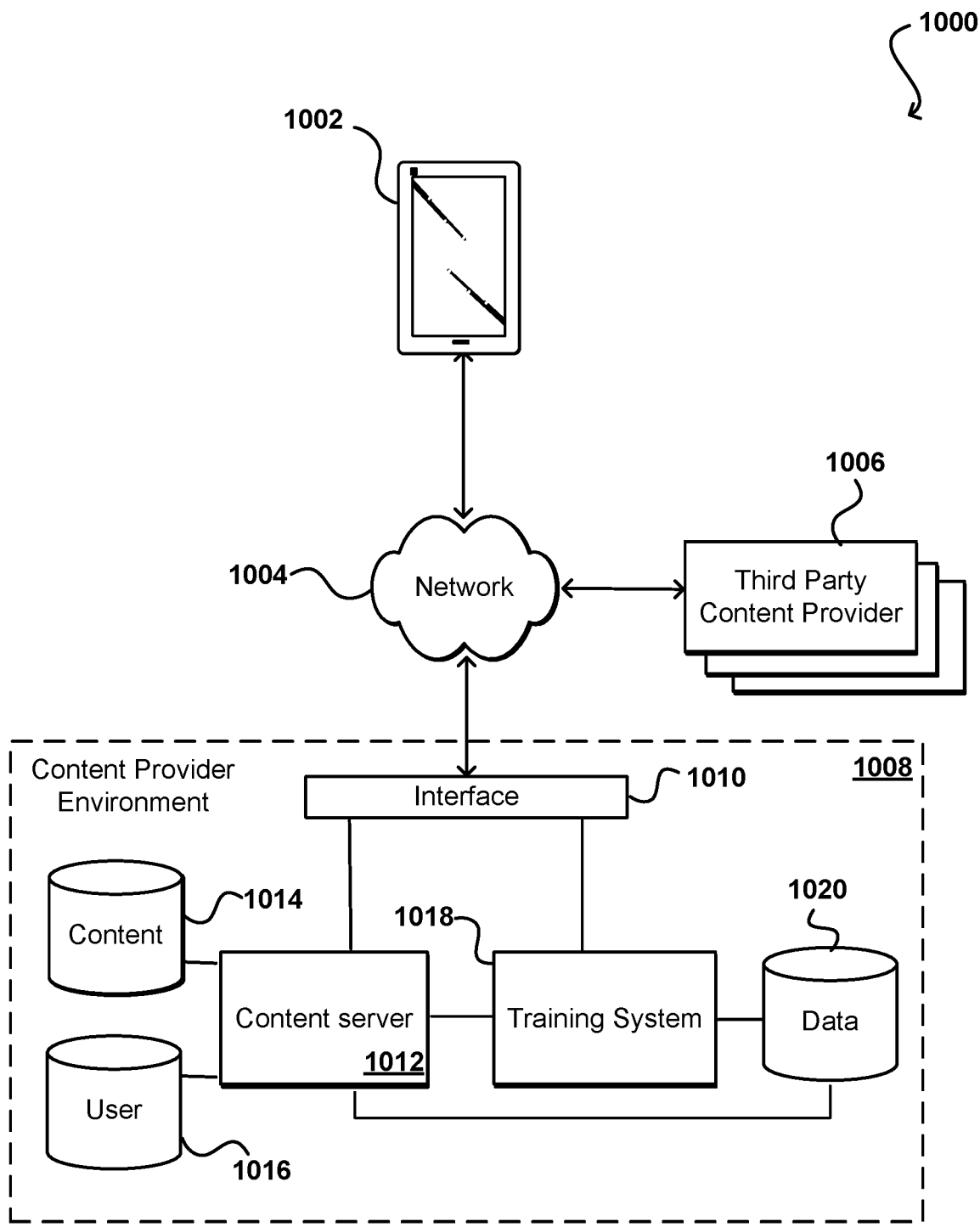
FIG. 10 illustrates a system that can be used to train a neural network in accordance with various embodiments.

FIG. 10 illustrates an example environment 1000 that can be used to implement aspects in accordance with various embodiments. As mentioned elsewhere herein, various network training and data manipulation tasks can be performed on a client device or by a network service, among other such options. In FIG. 10, a client computing device 1002 can submit a request for content across at least one network 1004 to be received by a content provider environment 1008. In some embodiments, the content provider environment can be a resource provider environment, where results of usage of the capacity returned to a user are considered content. As mentioned, in at least some embodiments the request can include input for which a user of the client computing device 1002 wants to obtain classification or identification information, for example. The network(s) can include any appropriate network, such as the Internet, a local area network (LAN), a cellular network, an Ethernet, or other such wired and/or wireless network. The content provider environment 1008 can include any appropriate resources for providing content from a resource provider, as may include various servers, data stores, and other such components known or used for providing content from across a network (or from the "cloud").

In this example, a call received to the content provider environment 1008 can be received by an interface layer 1010 of the environment. As known for network environments, the interface layer can include components such as interfaces (e.g., APIs), load balancers, request and/or data routers, and the like. If the request is a request for content, such as for content related to a query image, information for the request can be directed to one or more content servers 1012, which can obtain the relevant content from a content data store 1014 or other such repository to be sent back across the network(s) to the computing device. In some embodiments, information for the request might be compared against user data in a user data store 1016 or other such location to determine, for example, whether the user has access rights to that content. In some cases, a call or request received to the content provider environment 1008 might be from another entity, such as a third party content provider 1006.

The interface layer can determine the type of call or request and cause information to be forwarded to the appropriate component or sub-system. For example, training data can be stored to a data store 1020 for use in training a neural network by a training system or service 1018, with the resulting training sets being stored to the same or a different data store 1020, or the content repository 1014. When a request for content is received, data for the request can be processed using a trained neural network. Once an inference is made, the inference can be forwarded to the content server 1012 which can pull the corresponding content from an appropriate data store 1014 or 1020 and returned to the client computing device 1002.

Figure 11:
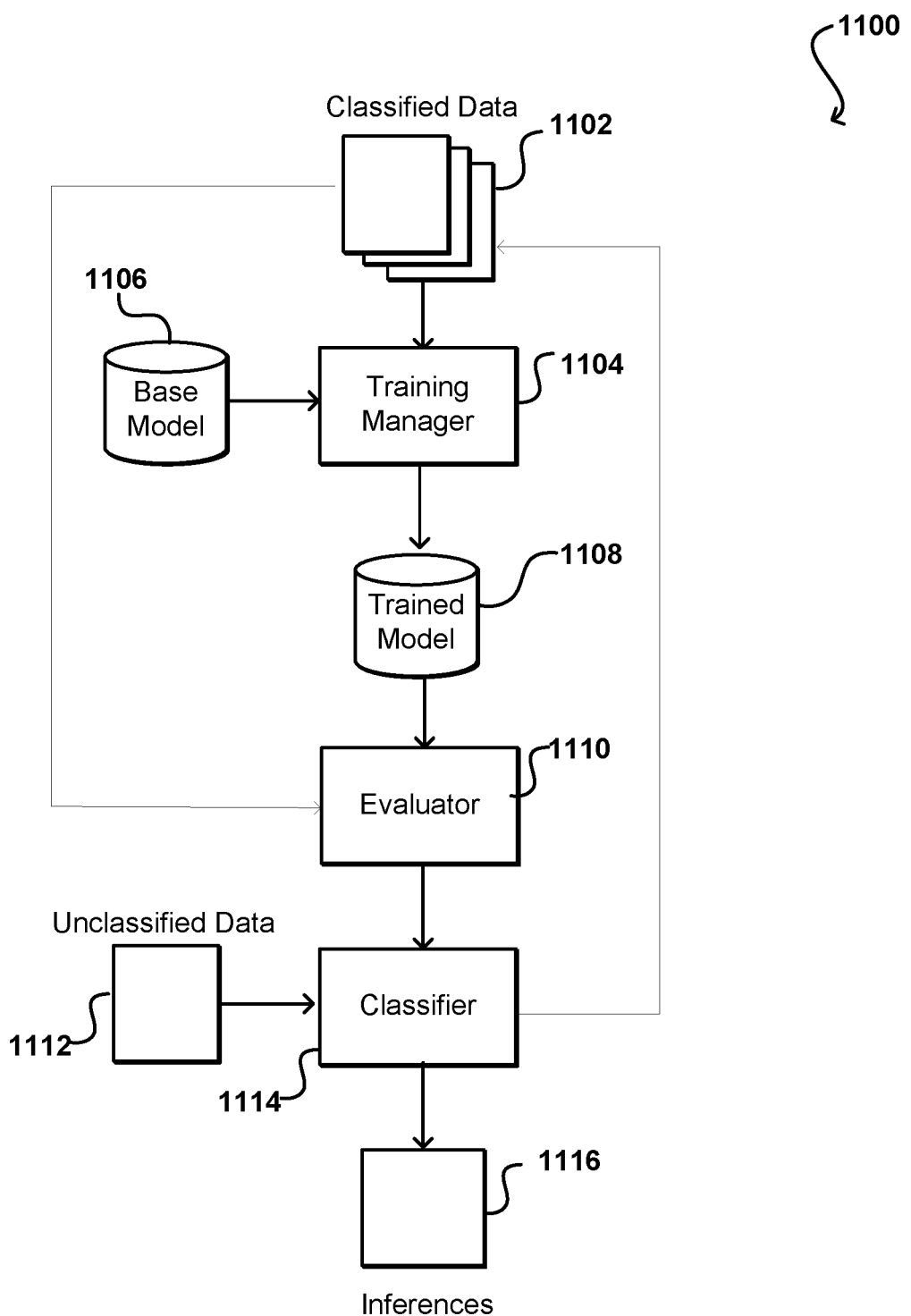
FIG. 11 illustrates components of an example training pipeline that can be utilized in accordance with various embodiments.

FIG. 11 illustrates an example system 1100 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 1102 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 1102 in this example is provided as training input to a training manager 1104. The training manager 1104 can be a system or service that includes hardware and software, such as one or more computing devices executing a training application, for training the statistical model. In this example, the training manager 1104 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 1104 can select a base model, or other untrained model, from an appropriate repository 1106 and utilize the classified data 1102 to train the model, generating a trained model 1108 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 1108 can be provided for use by a classifier 1114 in classifying unclassified data 1112. In many embodiments, however, the trained model 1108 will first be passed to an evaluator 1110, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known and use this assessment as a proxy for predictive accuracy on future data.

In some embodiments, a model is evaluated using a subset of the classified data 1102 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 1108 and the evaluator 1110 can determine the accuracy of the model by comparing the ground truth data against the corresponding output (or predictions/observations) of the model. The evaluator 1110 in some embodiments can provide a summary or performance metric indicating how well the predicted and true values match. If the trained model does not satisfy at least a minimum performance criterion, or other such accuracy threshold, then the training manager 1104 can be instructed to perform further training, or in some instances try training a new or different model, among other such options. If the trained model 1108 satisfies the relevant criteria, then the trained model can be provided for use by the classifier 1114.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources but has failed to generalize the patterns in the data. Overfitting often occurs when the training data includes all of the data used in the evaluation. A model that has been over fit may perform well during evaluation but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances. \

In the example system 1100 of FIG. 11, the trained model 1110 after evaluation is provided, or made available, to a classifier 1114 that is able to use the trained model to process unclassified data. This may include, for example, data received from users or third parties that are not classified, such as query images that are looking for information about what is represented in those images. The unclassified data can be processed by the classifier using the trained model, and the results 1116 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 1108 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances, the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 12:
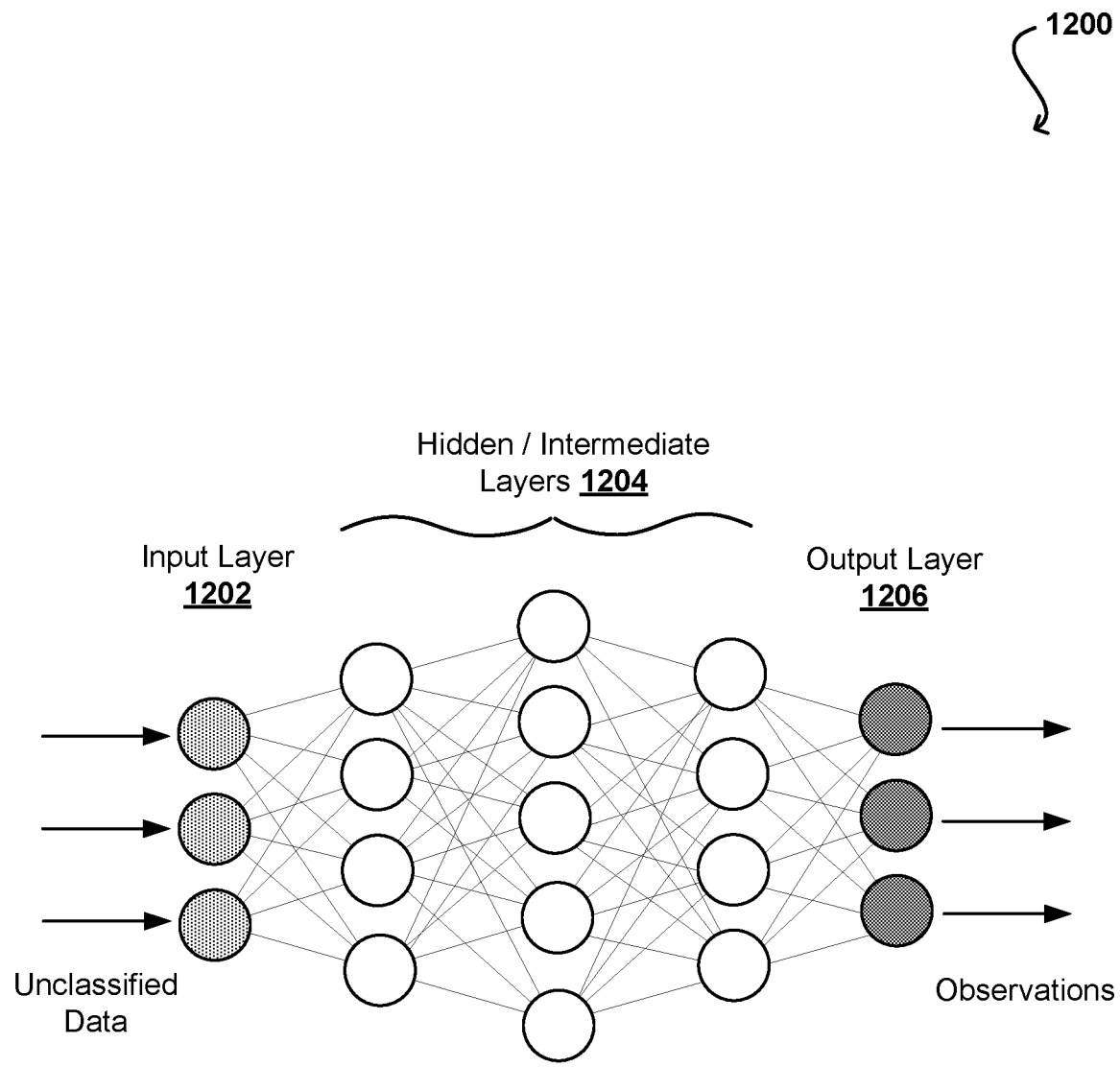
FIG. 12 illustrates an example neural network that can be utilized in accordance with various embodiments.

FIG. 12 illustrates an example statistical model 1200 that can be utilized in accordance with various embodiments. In this example the statistical model is an artificial neural network (ANN) that includes a multiple layers of nodes, including an input layer 1202, an output layer 1206, and multiple layers 1204 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBOS) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 13:
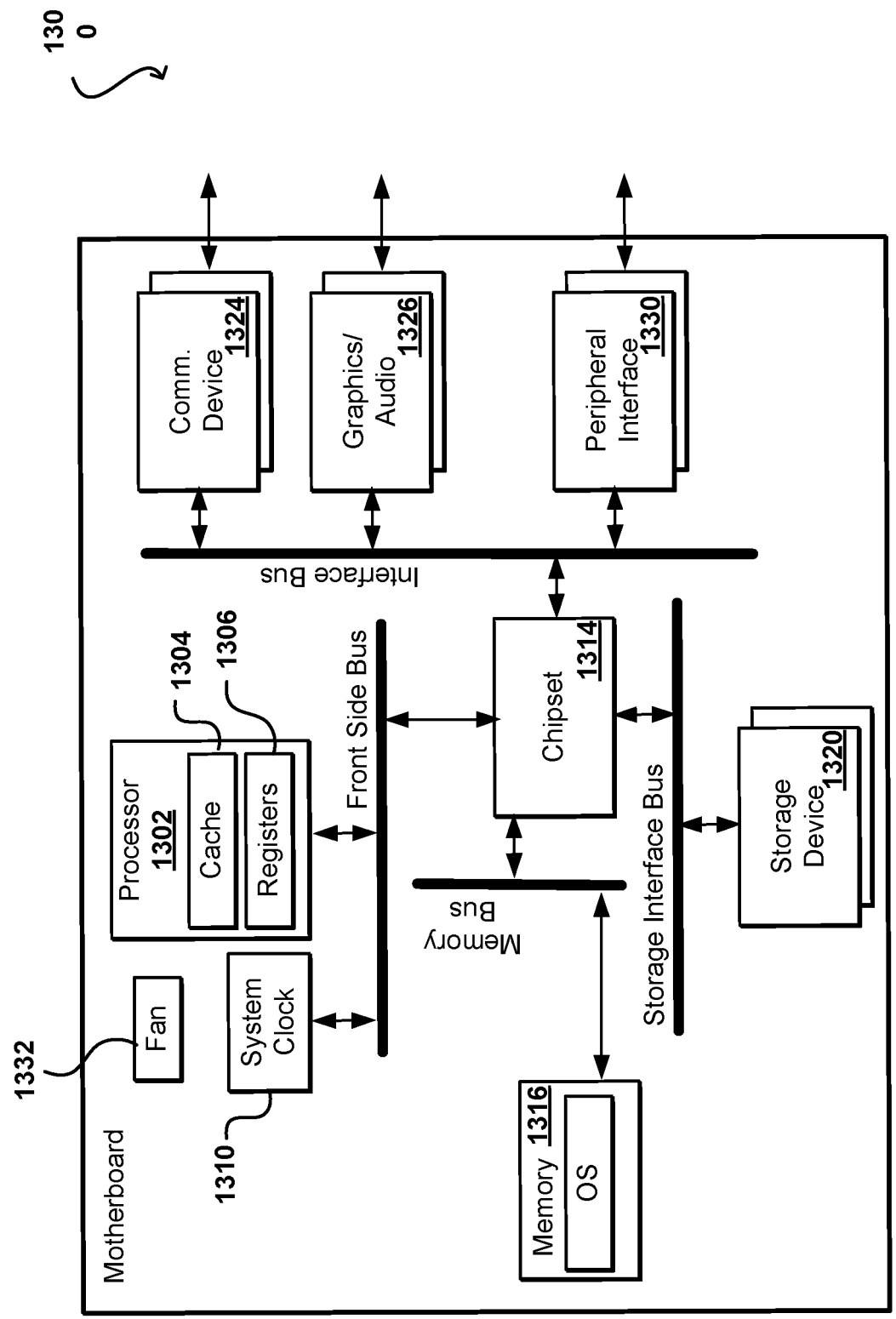
FIG. 13 illustrates components of an example computing device that can be used to implement aspects of various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 13 illustrates components of an example computing device 1300 that can be utilized in accordance with various embodiments. As known for computing devices, the computer will have one or more processors 1302, such as central processing units (CPUs), graphics processing units (GPUs), and the like, that are electronically and/or communicatively coupled with various components using various buses, traces, and other such mechanisms. A processor 1302 can include memory registers 1306 and cache memory 1304 for holding instructions, data, and the like. In this example, a chipset 1314, which can include a northbridge and southbridge in some embodiments, can work with the various system buses to connect the processor 1302 to components such as system memory 1316, in the form or physical RAM or ROM, which can include the code for the operating system as well as various other instructions and data utilized for operation of the computing device. The computing device can also contain, or communicate with, one or more storage devices 1320, such as hard drives, flash drives, optical storage, and the like, for persisting data and instructions similar, or in addition to, those stored in the processor and memory. The processor 1302 can also communicate with various other components via the chipset 1314 and an interface bus (or graphics bus, etc.), where those components can include communications devices 1324 such as cellular modems or network cards, media components 1326, such as graphics cards and audio components, and peripheral interfaces 1330 for connecting peripheral devices, such as printers, keyboards, and the like. At least one cooling fan 1332 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1302 can obtain data from physical memory 1316, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 1304 in at least some embodiments. The computing device 1300 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 1330, a communication device 1324, a graphics or audio card 1326, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 1302 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 14:
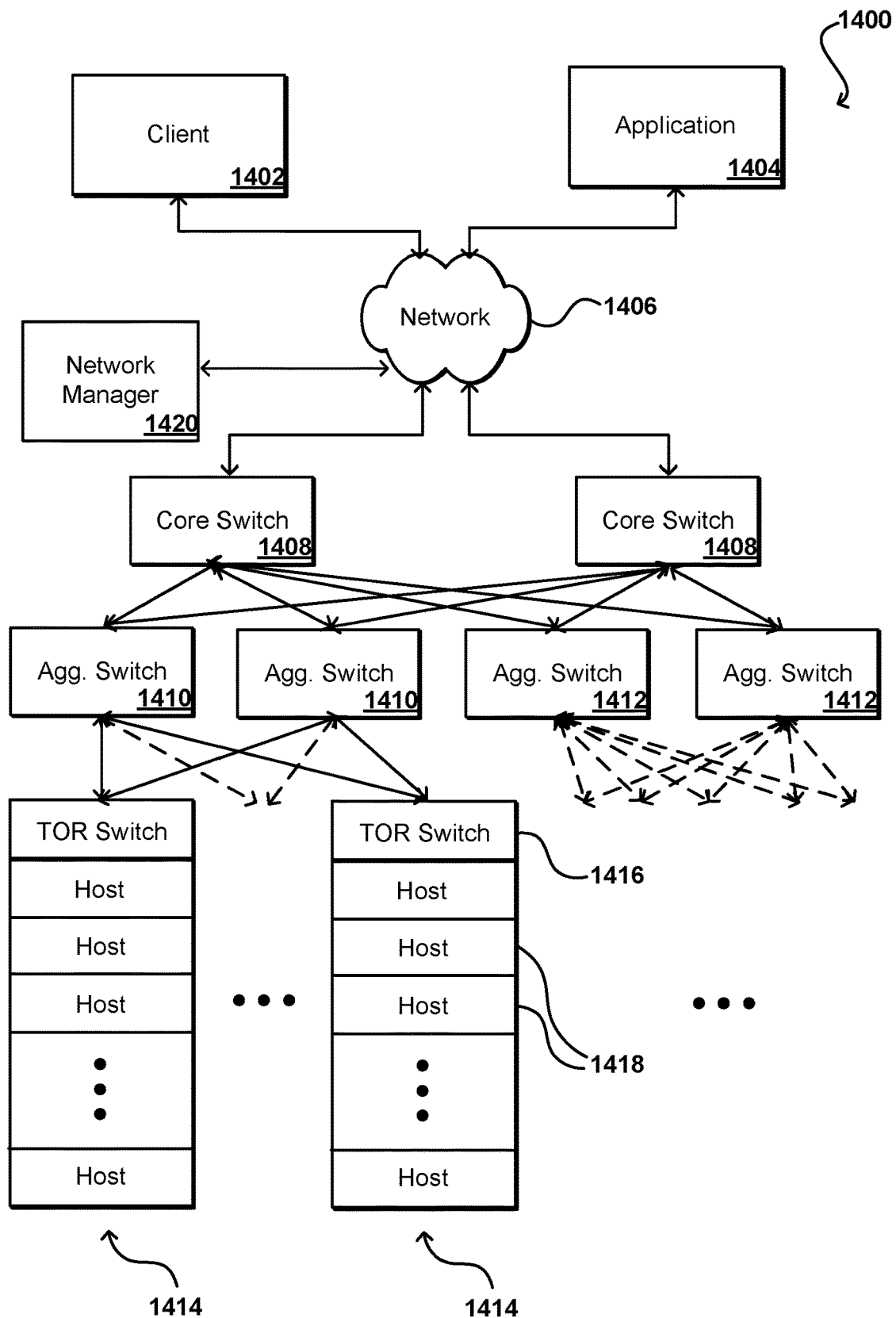
FIG. 14 illustrates components of an example environment in which aspects of the various embodiments can be implemented.

FIG. 14 illustrates an example network configuration 1400 that can be used to route communications between specific host machines or other such devices in such an environment. This example shows a typical design that can be used for a data center, wherein a source such as a client device 1402 or application 1404 is able to send requests across at least one network 1406, such as the Internet or a cellular network, to be received by one or more components of the data center. Properties of various components of the network, such as provisioned instances, etc., can be managed using at least one management system, component, or service 1420. In this example, the requests are received over the network to one of a plurality of core switches 1408, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 1408 is able to communicate with each of a plurality of aggregation switches 1410, 1412, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 1410, 1412 is linked to a plurality of physical racks 1414, each of which typically contains a top of rack (TOR) or "access" switch 1416 and a plurality of physical host machines 1418, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 1406. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 15:
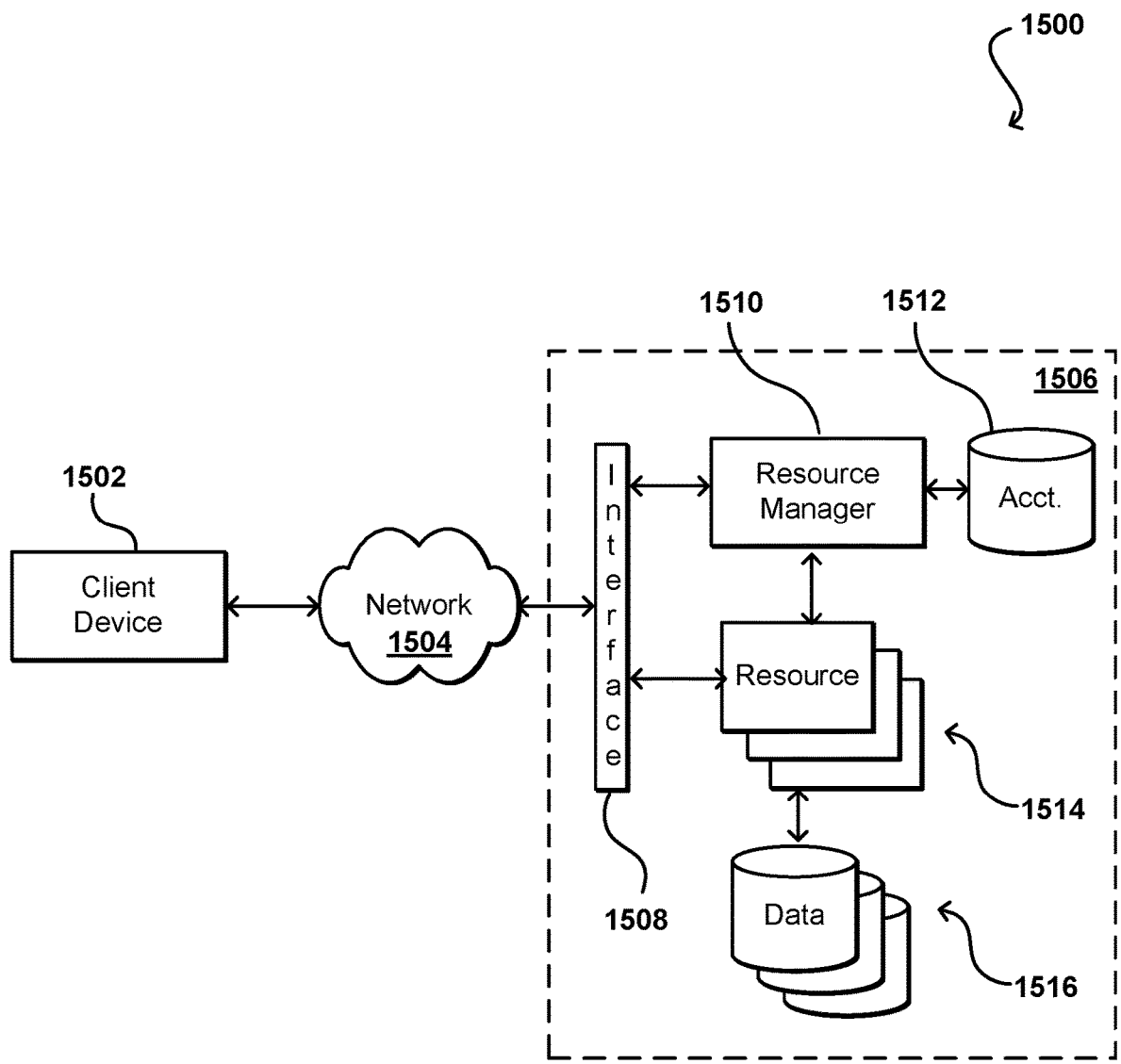
FIG. 15 illustrates components of another example environment that can be used to implement aspects of the various embodiments.

As mentioned, such a configuration can be used in some embodiments to provide resource capacity for one or more users or customers as part of a shared resource environment. FIG. 15 illustrates an example of one such environment 1500 in which aspects of the various embodiments can be implemented. In this example a user is able to utilize a client device 1502 to submit requests across at least one network 1504 to a multi-tenant resource provider environment 1506. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 1504 can include any appropriate network, including an intranet, the Internet, a cellular network, a local area network (LAN), or any other such network or combination, and communication over the network can be enabled via wired and/or wireless connections. The resource provider environment 1506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 1514 of one or more types. These types can include, for example, application servers operable to process instructions provided by a user or database servers operable to process data stored in one or more data stores 1516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 1514 can submit a request that is received to an interface layer 1508 of the provider environment 1506. The interface layer can include application programming interfaces (APIs) or other exposed interfaces enabling a user to submit requests to the provider environment. The interface layer 1508 in this example can also include other components as well, such as at least one Web server, routing components, load balancers, and the like. When a request to provision a resource is received to the interface layer 1508, information for the request can be directed to a resource manager 1510 or other such system, service, or component configured to manage user accounts and information, resource provisioning and usage, and other such aspects. A resource manager 1510 receiving the request can perform tasks such as to authenticate an identity of the user submitting the request, as well as to determine whether that user has an existing account with the resource provider, where the account data may be stored in at least one data store 1512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 1502 to communicate with an allocated resource without having to communicate with the resource manager 1510, at least until such time as a relevant aspect of the user account changes, the user is no longer granted access to the resource, or another such aspect changes.

The resource manager 1510 (or another such system or service) in this example can also function as a virtual layer of hardware and software components that handles control functions in addition to management actions, as may include provisioning, scaling, replication, etc. The resource manager can utilize dedicated APIs in the interface layer 1508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 1508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NOS, and CIOS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

Such an environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining, using a bidding module, a bid amount for a keyword to be submitted to a provider of a search engine;
   monitoring performance of paid search results for the keyword, via the search engine, using the bid amount as submitted to obtain paid performance data;
   receiving, from the bidding module, the bid amount for the keyword to be submitted to the provider of the search engine, the search engine presented on at least one interface on a network-connected client device;
   storing the monitored performance of the paid search results for the keyword, via the search engine, using the bid amount for the keyword as submitted to the provider, the paid performance data including at least interaction data;
   executing a model to predict an average rank of unpaid search results for the keyword on a results page of the search engine;
   receiving additional information for the unpaid search results, the additional information including a content link and at least one display characteristic of a result page on which search results for the keyword are able to be displayed;
   providing the bid amount, the predicted average rank, the additional information, and information about the performance of paid search results as input to a bidding evaluation model, the bidding evaluation model trained to determine an adjustment to the bid amount based, at least in part, upon a recovery propensity of the unpaid search results;

receiving, as output of the bidding evaluation model, a bid modifier, the bid modifier accounting for the recovery propensity of the unpaid search results, the recovery propensity based at least in part on a ranking and the at least one display characteristic of the result page on which search results for the keyword are able to be displayed; and applying, via one or more servers, the bid modifier to the bid amount for submission to the provider of the search engine with respect to the keyword.

2. The computer-implemented method of claim 1, further comprising:

determining the average rank for the unpaid search results using at least one of a predictive model or a rank tracking service.

3. The computer-implemented method of claim 1, further comprising:

providing as input to the bidding evaluation model an optimization criterion, the optimization criterion indicating to optimize the bid modifier for profit, revenue, impressions, clicks, downstream impact, or purchases.

4. The computer-implemented method of claim 1, further comprising:

obtaining unpaid search ranking and Uniform Resource Locator (URL) data for a plurality of search query report (SQR) values; and grouping associated keywords, SQRs, and URLs for submission as keyword-level input to the bidding evaluation model.

5. A computer-implemented method, comprising:

determining, using a bidding module, a first bid amount for a keyword submitted to a provider of a search engine;

monitoring performance of paid search results for the keyword, via the search engine, using the first bid amount as submitted to obtain paid performance data;

obtaining the paid performance data, including at least interaction data, for the paid search results for the keyword and corresponding to the first bid amount, determined with the bidding module, submitted to the provider of the search engine, the search engine presented on at least one interface on a network-connected client device;

executing a model to predict unpaid performance data of unpaid search results for the keyword on the search engine;

receiving information for the unpaid search results that includes at least a content link, the unpaid performance data including the information and at least one display characteristic of a result page on which search results for the keyword are able to be displayed;

inferring, using a bidding evaluation model, a bid modifier, the bidding evaluation model trained to determine an adjustment to the first bid amount based, at least in part, upon the paid performance data and the predicted unpaid performance data provided as input, and the bidding evaluation model accounting for a recovery propensity based at least in part on a ranking and the at least one characteristic of the result page on which search results for the keyword are able to be displayed; and submitting, to the provider of the search engine, a second bid amount resulting from applying, via the one or more servers, the bid modifier to the first bid amount.

6. The computer-implemented method of claim 5, further comprising:

determining the rank for the unpaid search results using at least one of a predictive model or a rank tracking service.

7. The computer-implemented method of claim 5, further comprising:

providing as input to the bidding evaluation model an optimization criterion, the optimization criterion indicating to optimize the bid modifier for profit, revenue, impressions, clicks, downstream impact, or purchases.

8. The computer-implemented method of claim 5, further comprising:

obtaining unpaid search ranking and Uniform Resource Locator (URL) data for a plurality of search query report (SQR) values; and grouping associated keywords, SQRs, and URLs for submission as keyword-level unpaid performance data to be input to the bidding evaluation model.

9. The computer-implemented method of claim 5, further comprising:

providing information about at least one sponsored ad, related to the keyword, to be provided as input to the bidding evaluation model.

10. The computer-implemented method of claim 5, further comprising:

utilizing the bidding evaluation model to determine bid modification values for a plurality of keywords or queries.

11. The computer-implemented method of claim 5, further comprising:

determining, for a bid amount modified by a respective bid modifier, not to submit a bid when the modifier bid amount is zero or below a minimum bid threshold.

12. The computer-implemented method of claim 5, further comprising:

determining the bid modifier for at least one of a device type, a region, a language, a search engine provider, or an application.

13. The computer-implemented method of claim 5, further comprising:

clustering keywords into a plurality of keyword clusters; and using the bidding evaluation model to determine bid modifiers for the keyword clusters.

14. A system, comprising:

a processor; and memory including instructions that, when executed by the processor, cause the system to:

determine, using a bidding module, a first bid amount for a keyword submitted to a provider of a search engine;

monitor performance of paid search results for the keyword, via the search engine, using the first bid amount as submitted to obtain paid performance data;

obtain the paid performance data, including at least interaction data, for the paid search results for the keyword and corresponding to the first bid amount, determined with the bidding module, submitted to the provider of the search engine, the search engine presented on at least one interface on a network-connected client device;

execute a model to predict unpaid performance data of unpaid search results for the keyword on the search engine;

receive information for the unpaid search results that includes at least a content link and at least one display characteristic of a result page on which search results for the keyword are able to be displayed, the unpaid performance data including the information;

infer, using a bidding evaluation model, a bid modifier, the bidding evaluation model trained to determine an adjustment to the first bid amount based, at least in part, upon the paid performance data and the predicted unpaid performance data provided as input, and the bidding evaluation model accounting for a recovery propensity based at least in part on a ranking and the at least one characteristic of the result page on which search results for the keyword are able to be displayed; and submit, to the provider of the search engine, a second bid amount resulting from applying, via the processor, the bid modifier to the first bid amount.

15. The system of claim 14, wherein the instructions when executed further cause the system to:

determine the rank for unpaid search results using at least one of a predictive model or a rank tracking service.

\* \* \* \* \*